(No Model.)

H. PIETSCH.
STENCH TRAP.

No. 301,151. Patented July 1, 1884.

WITNESSES:
Theo. G. Hoster
C. Sedgwick

INVENTOR:
H. Pietsch
BY Munn & Co
ATTORNEYS.

UNITED STATES PATENT OFFICE.

HERMAN PIETSCH, OF FLATBUSH, NEW YORK.

STENCH-TRAP.

SPECIFICATION forming part of Letters Patent No. 301,151, dated July 1, 1884.

Application filed June 26, 1883. (No model.)

*To all whom it may concern:*

Be it known that I, HERMAN PIETSCH, of Flatbush, in the county of Kings and State of New York, have invented a new and Improved Stench-Trap, of which the following is a full, clear, and exact description.

The object of my invention is to provide a new and improved stench-trap which is of simple construction, flushes and cleans itself automatically after use, and is made transparent, so that its contents can be seen at all times.

The invention consists, principally, of an exterior bowl or cup connected to the inlet and outlet pipes, and combined with a tube projecting down through the middle of the outer cup and terminating in a glass tube, and a glass cup surrounding the glass tube and suspended from the pipe to which the glass tube is fastened.

The invention also consists in an inclined tube projecting from the inner surface of the waste-tube, and provided on its outer end with a valve-plate, as will be fully explained and set forth hereinafter.

Reference is to be had to the accompanying drawings, forming part of this specification, in which similar letters of reference indicate corresponding parts in all the figures.

Figure 1:
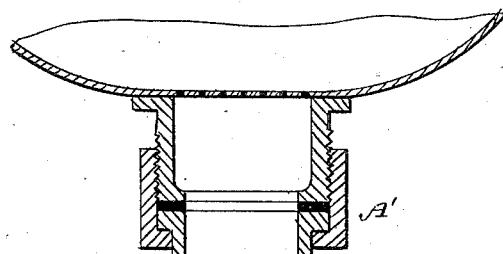
Figure 2:
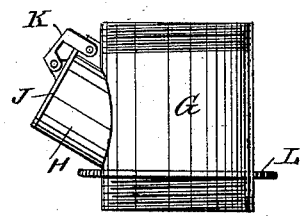
Figure 3:
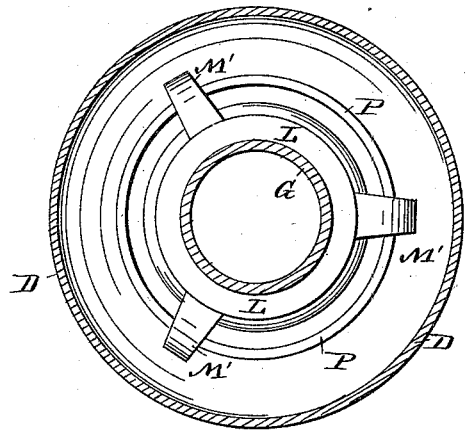

Figure 1 is a longitudinal sectional elevation of my improved stench-trap. Fig. 2 is a detail view of the tube provided with the valve. Fig. 3 is a sectional plan view of the trap on the line *x x*, Fig. 1.

A tube, A, provided at one end with a loose threaded sleeve, A', is screwed at its lower end into a flanged cap-plate or cover, B, screwed into a neck, C, which is packed tightly, as seen in Fig. 1, upon the top of a glass cup, D, provided at its bottom with a fixed neck, E, to which the waste-pipe F is screwed. A short tube, G, is screwed on the bottom of the cover or cap-plate B, and is provided with a small downwardly-inclined tube, H, which projects from the side of the tube G at the inner and outer surfaces, the top of the inner end of the tube H projecting farther from the inner surface of the tube G than the lower part of the said tube H. A valve plate or cap, J, resting on the outer upper end of the tube H, is pivoted to an angular arm, K, pivoted to a jaw on the top of the tube G, or to any other suitable lug or jaw. The weight of the valve-plate keeps it on the end of the tube H, and thus keeps the upper outer end of the said tube closed, at the same time permitting the valve-plate to swing upward. The tube G is provided with an annular ridge, L, a short distance above the lower end, and below the said ridge a spider-frame, M, is loosely mounted on the tube G, the said spider-frame being held in place by being clamped between the annular ridge L and neck N, screwed on the lower end of the tube G, the neck N being fastened to the upper end of a piece of glass tube, O, which is thus held on the lower end of the tube G. The arms M' of the spider-frame are made of spring material and are bent downward, and are provided on the ends with short inward bends *m*. A glass cup, P, is provided in its outer surface with an annular groove, Q, a short distance from its upper edge. The upper end of the cup P is passed between the free ends of the spring-arms M', so that the curved parts *m* of the arms M' pass into the groove Q and clamp and hold the cup P in place under the pipe O, which projects into it. The water passing through the tubes A, G, and O passes into the cup P and rises in the same until it flows over the top edge and runs down into the cup D. The lower end of the tube O will always be immersed, and there is no danger of an escape of gas. If a vacuum is created in the trap, the valve J opens upwardly and permits air to pass into the trap, thus preventing siphoning out of the trap, so that hairs, pieces of vegetables, and other matter that has passed the strainer of the wash-bowl or sink cannot pass in between the valve J and the outer edge of the tube H. I have arranged the tube H in the manner shown so that its inner end forms a shield which prevents the pieces of solid matter from being washed up into the tube H, and guides them off and conducts them down through the tubes G and O.

Glass bowls in a stench-trap have the advantage that they do not corrode, as metal does, as all parts in which the water stands are of glass and remain clean, and are transparent, so that an accumulation of dirt in the trap can easily be discovered.

Having thus described my invention, what I claim as new, and desire to secure by Letters Patent, is—

1. In a stench-trap, the combination, with an exterior bowl or cup connected at the top and bottom with the inlet and outlet pipes, respectively, of a tube projecting down through the midddle of the outer cup and terminating in a glass tube, and a glass cup surrounding the glass tube and suspended from the pipe to which the glass tube is fastened, substantially as herein shown and described.

2. In a stench-trap, the combination, with the bowl or cup D, of the tube G, the glass tube O, fastened to the lower end of the latter, the spider-frame M, held on the lower end of the tube G, and the cup or bowl P, held by the spider-frame, substantially as herein shown and described.

3. In a stench-trap, the combination, with the cup D, of the tube G, cover B, the glass tube O, the spider-frame M, having arms M', provided with bends $m$ in the ends, and the cup or bowl P, provided with an annular groove, Q, at its upper end, substantially as herein shown and described.

4. In a stench-trap, the combination, with the cups D P and the tubes G O, of the downwardly-inclined tube H, extending through the tube G and projecting from the inner surface of the same, and of a valve-plate, J, held on the outer upper surface of the said tube H, substantially as herein shown and described.

HERMAN PIETSCH.

Witnesses:
 OSCAR F. GUNZ,
 C. SEDGWICK.